(12) United States Patent
Yang

(10) Patent No.: US 10,001,595 B2
(45) Date of Patent: Jun. 19, 2018

(54) DISPLAY DEVICE

(71) Applicant: AU OPTRONICS CORPORATION, Hsin-Chu (TW)

(72) Inventor: Syuan-Ling Yang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days. days.

(21) Appl. No.: 15/236,692

(22) Filed: Aug. 15, 2016

(65) Prior Publication Data

US 2017/0052307 A1 Feb. 23, 2017

(30) Foreign Application Priority Data

Aug. 18, 2015 (TW) .............................. 104126900 A

(51) Int. Cl.
F21V 8/00 (2006.01)
G02F 1/1335 (2006.01)

(52) U.S. Cl.
CPC ....... *G02B 6/0056* (2013.01); *G02F 1/13362* (2013.01); *G02F 2001/133614* (2013.01); *G02F 2202/36* (2013.01)

(58) Field of Classification Search
CPC combination set(s) only.
See application file for complete search history.

(56) References Cited

U.S. PATENT DOCUMENTS 7,481,562 B2 * 1/2009 Chua .................... G02B 6/0023
362/339
8,092,067 B2 1/2012 Huang et al.
2006/0164860 A1 * 7/2006 Muraoka .............. G02B 6/0056
362/607
2013/0107170 A1 5/2013 Gee et al.
2013/0135558 A1 5/2013 Kim et al.
2014/0362556 A1 12/2014 Cho et al.
2015/0009440 A1 1/2015 Lee et al.
2015/0037203 A1 * 2/2015 Pan ....................... H01L 51/502
422/22

FOREIGN PATENT DOCUMENTS

| CN | 103091892 A | 5/2013 |
|---|---|---|
| CN | 104360536 A | 2/2015 |
| TW | 201222098 A1 | 6/2012 |

OTHER PUBLICATIONS

Office Action dated Jun. 21, 2016 in corresponding patent application in Taiwan.

* cited by examiner

*Primary Examiner* — Nimeshkumar Patel
*Assistant Examiner* — Jacob R Stern
(74) *Attorney, Agent, or Firm* — McClure, Qualey & Rodack, LLP

(57) ABSTRACT

A display device includes a lower substrate, a light source, a polarized light activation layer, an inner polarizer layer, a light modulation layer, and an upper substrate. The lower substrate has a light entrance side, and a bottom surface and a top surface opposite to each other. The light source generates light entering the lower substrate through the light entrance side. The light entering into the lower substrate at least partially passes through the bottom surface to enter and excite the polarized light activation layer into generating a plurality of polarized color lights of different colors. The polarized color lights have their polarization levels increased by the inner polarizer layer before reaching the light modulation layer.

17 Claims, 6 Drawing Sheets

DISPLAY DEVICE

BACKGROUND

1. Technical Field

The present disclosure generally relates to a display device; particularly, the present disclosure relates to a display device with a single film backlight unit.

2. Description of the Related Art

As optical display devices continually evolve, manufacturers of optical display devices have started to direct the research and development focus of their optical display devices towards slimmer, lighter, and brighter displays in order to meet customers' needs. For instance, a key component for having competitive relevance with the products being placed on the market by each manufacturer depends largely on how much the thickness and weight of displays on a mobile phone, laptop computer, or television display may be decreased, as well as how much the display effects may be increased thereof.

In terms of conventional liquid crystal displays (LCD) as an example, each of traditional LCDs must be accompanied with an independent backlight module to provide light for the LCD. As illustrated in FIG. 1A, the backlight module of the traditional LCD includes a light source LS and a light-guide plate LGP. In the traditional LCD, the light-guide plate LGP is disposed below the liquid crystal layer LC and the polarizer layer P, as shown in FIG. 1A. However, in comparison to the thickness of the liquid crystal layer LC and the polarizer layer P, the thickness of the light-guide plate LGP is relatively greater. In actual circumstances, since the backlight module and the light-guide plate LGP within it will take up a definite portion of thickness, the thickness of the entire display device may not be easily decreased or lowered.

As illustrated in FIG. 1B of a traditional organic light-emitting diode (OLED) display, the OLED layer is sandwiched between the polarizer layer P and the protective layer PF, wherein the OLED layer can directly generate light. In comparison to the liquid crystal display, the thickness of the OLED display is smaller than the thickness of the liquid crystal display since the backlight module is not needed in the OLED display. However, the OLED display can only be efficiently operated within specific environments, such as room temperature and normal humidity levels. Under high or low temperatures, or even in high or low humidity levels, the display performance of the OLED display will dramatically decrease.

When comparing the differences between LCDs and OLED displays, the angle of the full-width half-maximum (FWHM) of the light distribution of the LCD will typically be narrower than the angle of the FWHM of the light distribution of the OLED display. As a result, the evenness in the light distribution of the image displayed by the LCD will be lower than the OLED display. In addition, in terms of the richness levels of the color displayed, the color richness of the LCD will also be comparatively lower than the OLED display. However, although OLED displays provide richer color and wider angle of the FWHM of the light distribution than LCDs, LCDs are vastly more stable and reliable in many more different conditions than OLED displays. Therefore, there is a need to develop a display that has the reliability of LCDs, but with the weight savings, wider angle of the FWHM of the light distribution, slimness, and color richness of OLED displays.

SUMMARY

It is an objective of the present disclosure to provide a display device having light source structure with low thickness.

It is another objective of the present disclosure to provide a display device having high levels of color richness.

In one aspect of the present invention, the display device includes a lower substrate, a light source, a polarized light activation layer, an upper substrate, an inner polarizer layer, and a light modulation layer. The lower substrate has a light entrance side, a bottom surface, and a top surface opposite to the bottom surface, wherein the light entrance side is respectively adjacently connected to the bottom surface and the top surface. The light source is disposed at the light entrance side and generates light entering the lower substrate from the light entrance side. The polarized light activation layer is disposed on the bottom surface. The upper substrate is disposed on the top surface. The inner polarizer layer is disposed on the top surface and positioned between the upper substrate and the lower substrate. The light modulation layer is disposed between the inner polarizer layer and the upper substrate, wherein at least a portion of the light entering the lower substrate passes through the bottom surface and enters the polarized light activation layer to excite the polarized light activation layer to generate a plurality of polarized color lights of different colors. The polarized color lights pass through the lower substrate to be raised in polarization levels by the inner polarizer layer before reaching the light modulation layer.

In another aspect of the invention, the display device includes a lower substrate, a light source, a quantum rod film, an upper substrate, an inner polarizer layer, and a light modulation layer. The lower substrate has a light entrance side, a bottom surface, and a top surface opposite to the bottom surface, wherein the light entrance side is respectively adjacently connected to sides of the bottom surface and the top surface. The light source is disposed at the light entrance side and generates light entering the lower substrate from the light entrance side. The quantum rod film is disposed on the bottom surface, and the upper substrate is disposed on the top surface. The inner polarizer layer is disposed on the top surface and positioned between the upper substrate and the lower substrate. The light modulation layer is disposed between the inner polarizer layer and the upper substrate, and wherein at least a portion of the light entering into the lower substrate passes through the bottom surface and enters the quantum rod film to excite the quantum rod film to generate a plurality of polarized color lights of different colors. The polarized color lights pass through the lower substrate to be raised in polarization level by the inner polarizer layer before reaching the light modulation layer.

In another aspect of the invention, the display device includes a lower substrate, a light source, a polarized light activation layer, an upper substrate, an inner polarizer layer, and a light modulation layer. The lower substrate has a light entrance side, a bottom surface, and a top surface opposite to the bottom surface, wherein the light entrance side is respectively adjacently connected to the bottom surface and the top surface. The light source is disposed at the light entrance side and generates light entering the lower substrate from the light entrance side. The polarized light activation layer is disposed on the top surface, and the upper substrate is disposed on the polarized light activation layer, wherein the inner polarizer layer is disposed on the top surface and positioned between the upper substrate and the lower substrate. The light modulation layer is disposed between the inner polarizer layer and the upper substrate, wherein at least a portion of the light entering the lower substrate passes through the top surface and enters the polarized light activation layer to excite the polarized light activation layer to generate a plurality of polarized color lights of different colors. The polarized color lights pass through the inner polarizer layer to be raised in polarization levels before reaching the light modulation layer.

DETAILED DESCRIPTION OF THE PREFERRED EMBODIMENT

In an embodiment, the present invention is applicable for use in liquid crystal displays, although the present invention is not limited to only liquid crystal displays. In other different embodiments, the present invention may be applied to other types of displays.

Figure 1A:
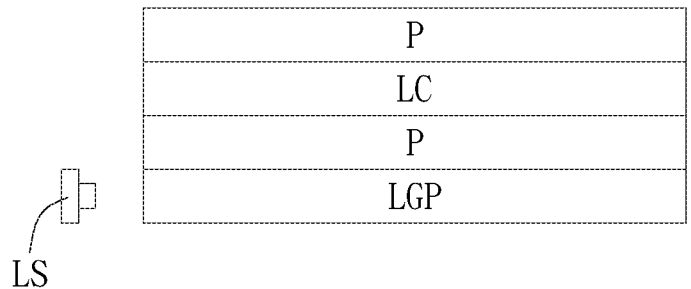
FIG. 1A is a cross-sectional view of a conventional display device having a light guide plate structure.
Figure 1B:
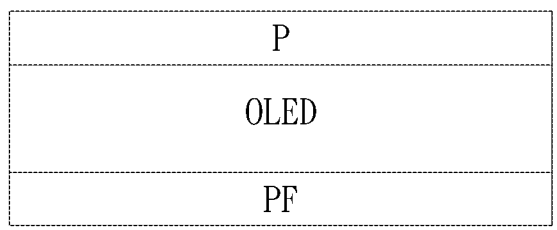
FIG. 1B is a cross-sectional view of a conventional OLED display device.
Figure 2A:
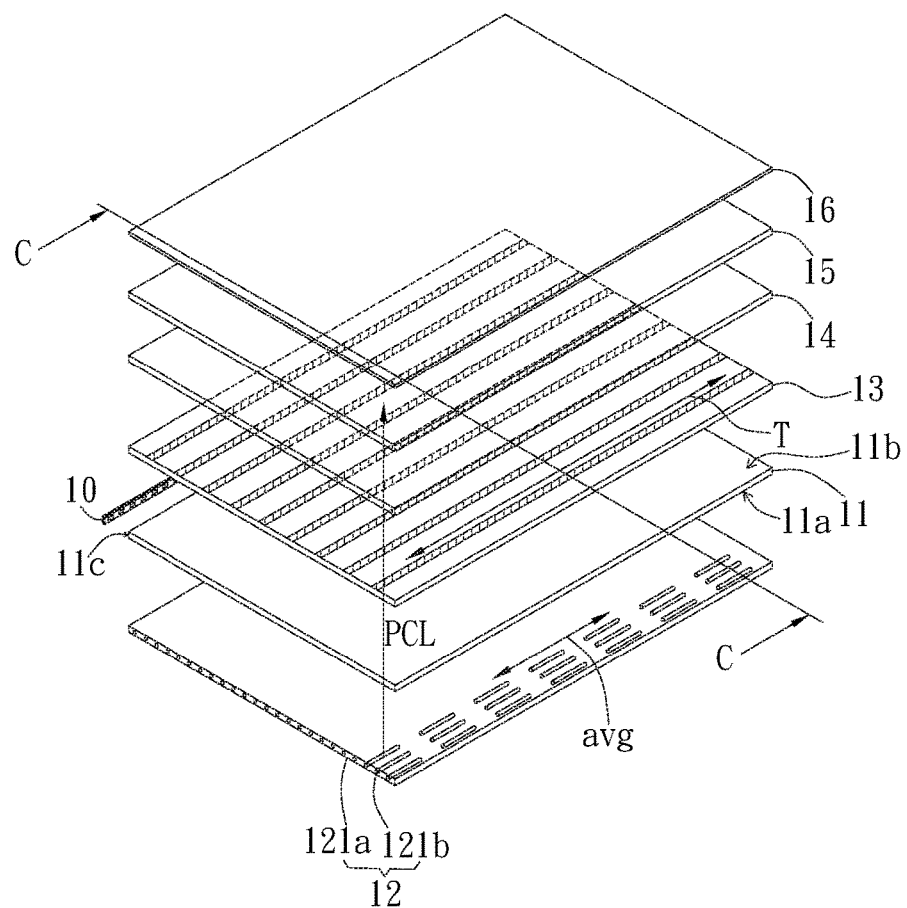
FIG. 2A is an embodiment of the display device of the present invention.
Figure 2B:
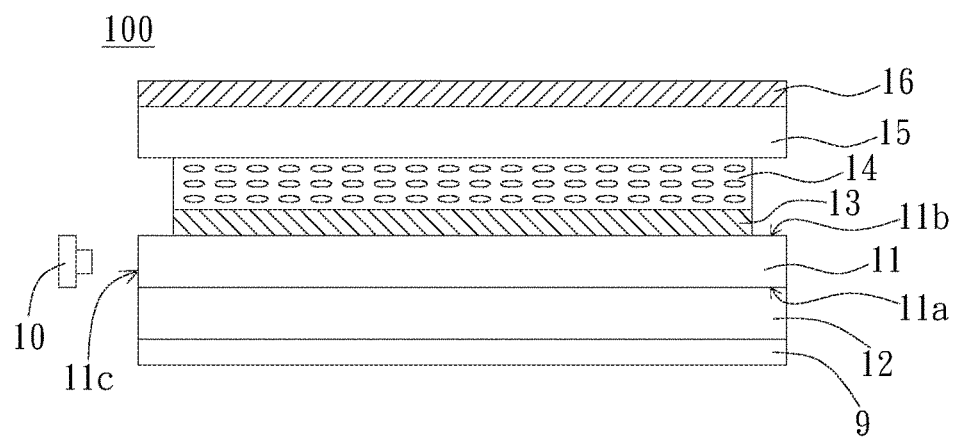
FIG. 2B is a cross-sectional view of the embodiment of FIG. 2A.

FIG. 2A is an embodiment of the display device of the present invention. As shown in FIG. 2A, the display device 100 includes a light source 10, a lower substrate 11, a polarized light activation layer 12, an inner polarizer layer 13, a light modulation layer 14, and an upper substrate 15, wherein the upper substrate 15 may also include an outer polarizer layer 16 on top. FIG. 2B is a cross-sectional view of the embodiment of FIG. 2A. In the present embodiment, the lower substrate 11 has a bottom surface 11a, a top surface 11b opposite to the bottom surface 11a, and a light entrance side 11c at a side of the bottom surface 11a and the top surface 11b. In other words, the light entrance side 11c is respectively adjacently connected to the bottom surface 11a and the top surface 11b. As shown in FIG. 2B, the light source 10 is disposed at the light entrance side 11c, wherein the light source 10 is facing towards the light entrance side 11c. The light source 10 generates light entering the lower substrate 11 from the light entrance side 11c. In the present embodiment, the light source 10 can be formed from a plurality of light-emitting diodes (LEDs). However, in other different embodiments, the light source 10 may be formed from other different light sources.

As illustrated in FIG. 2B, when the light source 10 is generating light, the light will be emitted from the light source 10 in the direction towards the lower substrate 11, wherein the light will enter the lower substrate 11 through the light entrance side 11c of the lower substrate 11. In the present embodiment, the lower substrate 11 has light guiding characteristics that allow the lower substrate 11 to direct the light to be emitted out of the lower substrate 11 from the bottom surface 11a and/or the top surface 11b.

Figure 3:
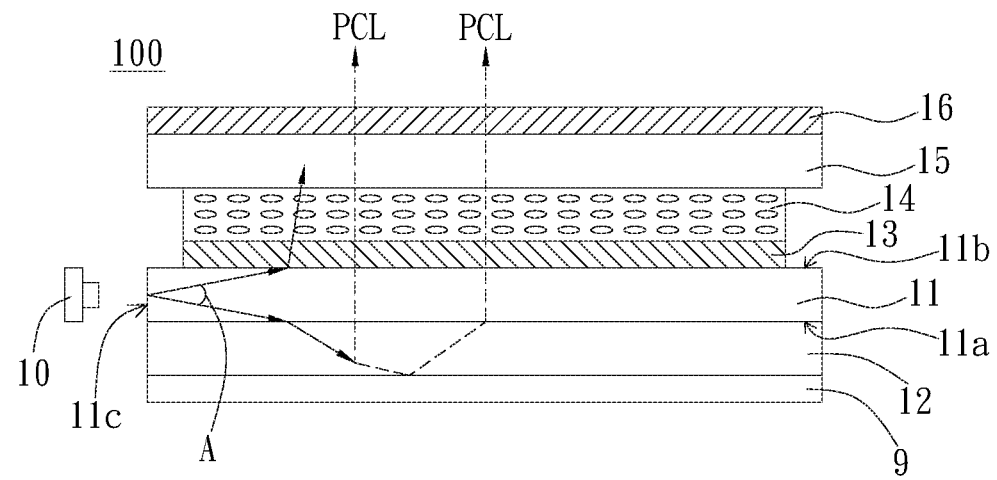
FIG. 3 is an embodiment of light generated by the light source entering the lower substrate.

FIG. 3 is an embodiment of the path of light travel of FIG. 2B. As shown in FIG. 3, if the light entering the lower substrate 11 is guided to emit out of the lower substrate 11 from the top surface 11b, the light emitting out from the top surface 11b will then firstly arrive at the inner polarizer layer 13 above the lower substrate 11. In the present embodiment, the inner polarizer layer 13 is disposed stacked onto the lower substrate 11, such as disposing the inner polarizer layer 13 onto the lower substrate 11 through coating methods. However, it should be noted that this is not the only method in which the inner polarizer layer 13 may be disposed onto the lower substrate 11 as other methods may also be utilized. As shown in FIG. 3, the inner polarizer layer 13 is disposed on the top surface 11b of the lower substrate 11 and positioned between the upper substrate 15 and the lower substrate 11. The polarized light activation layer 12 is disposed below the lower substrate 11 such that the lower substrate 11 is sandwiched between the inner polarizer layer 13 and the polarized light activation layer 12. In the present embodiment, when light generated by the light source 10 arrives at the inner polarizer layer 13 from the lower substrate 11, the inner polarizer layer 13 allow the portion of the light that has the same polarity as the inner polarizer layer 13 to pass through while blocking portions of the light that don't have the same polarity as the inner polarizer layer 13 from passing though.

Referring to FIG. 3, light that passes through the inner polarizer layer 13 and is polarized will then be selectively light modulated, not light modulated, or blocked by the light modulation layer 14. In the present embodiment, the light modulation layer 14 is a liquid crystal layer, wherein each liquid crystal structure within the liquid crystal layer can control display of a pixel in an image displayed by the display device 100. Therefore, when light from the inner polarizer layer 13 arrives at the light modulation layer 14, the liquid crystal structures within the light modulation layer 14 can make the polarity of the light rotate according to the alignment of the liquid crystal structures.

In the present embodiment, after passing through the light modulation layer 14, the light will then reach the upper substrate 15 above the light modulation layer 14. As illustrated in FIG. 3, the upper substrate 15 is used in conjunction with the lower substrate 11 to sandwich the light modulation layer 14, protecting the light modulation layer 14 from damage caused by external forces. In addition, according to design requirements with regards to optics or optical paths, an outer polarizer layer 16 can be disposed on the upper substrate 15 to help increase brightness levels and/or image clearness levels. In the present embodiment, the outer polarizer layer 16 is an optical film which can be adhered to the upper substrate 15 through an adhesive layer. However, the outer polarizer layer 16 is not limited or restricted to this as other different methods to fix the outer polarizer layer 16 onto the upper substrate may be employed in other different embodiments. For instance, the outer polarizer layer 16 can be disposed on the upper substrate 15 through coating methods. Accordingly to the mechanism of selective light modulation by the light modulation layer 14, the polarity of light can be modulated or changed, wherein light that has been modulation will be blocked or allowed to pass through the outer polarizer layer 16 when it arrives at the outer polarizer layer 16. The outer polarizer layer 16 will selectively block or allow light to pass through according to the polarity of the modulated light such that images may be generated and displayed by the display device 100.

However, if light generated by the light source 10 is guided down towards and emitted out of the bottom surface 11a of the lower substrate 11 upon entering the lower substrate 11 (as illustrated in FIG. 3), the light emitted out from the bottom surface ha will arrive at the polarized light activation layer 12. In the present embodiment, the polarized light activation layer 12 is disposed corresponding to the bottom surface 11a. The position that the polarized light activation layer 12 is disposed corresponds to or is adhered to the bottom surface 11a of the lower substrate 11. As illustrated in FIG. 3, the inner polarizer layer 13 is disposed on the top surface 11b of the lower substrate 11 such that the lower substrate 11 is sandwiched between the inner polarizer layer 13 and the polarized light activation layer 12. When light arrives at the polarized light activation layer 12, the light will excite and/or activate the polarized light activation layer 12 to generate light. In the present embodiment, the brightness level of the light generated by the polarized light activation layer 12 will be greater than the brightness level of the light generated by the light source 10. In addition, in comparison to a light-guide plate or a light diffusion layer, the light distribution generated by the polarized light activation layer 12 will be more uniform, increasing the display effects of the display device 100 as a result. In the present embodiment, light generated by the polarized light activation layer 12 will partially (or a portion thereof) be emitted in the direction towards the bottom surface 11a of the lower substrate 11. After arriving at the bottom surface 11a of the lower substrate 11, this portion of light will pass through the lower substrate 11. Then, accordingly to the above mentioned fashion, the light will pass through the light modulation layer 14 and the upper substrate 15 to form the display image of the display device 100.

Referring still to FIG. 3, as mentioned above, when light generated from the light source 10 enters the lower substrate 11 from the light entrance side 11c, a portion of the light will be emitted out from the bottom surface 11a of the lower substrate 11 and enter the polarized light activation layer 12, wherein the other portion of light will be emitted out of the top surface 11b of the lower substrate 11 and enter the inner polarizer layer 13. Light generated by the light source 10 are non-polarized light, and as such the light leaving the lower substrate 11 and entering the inner polarizer layer 13 and/or the polarized light activation layer 12 are non-polarized lights.

In the present embodiment, as illustrated in FIGS. 2A and 3, in terms of the cross-section that is simultaneously perpendicular to both the light entrance side 11c and the bottom surface 11a, an angle A of the full-width half-maximum (FWHM) of light generated by the light source 10 is between 10 degrees to 60 degrees. In this manner, light generated by the light source 10 can be more uniform and can more easily reach the polarized light activation layer 12. In other words, by making sure the light generated by the light source 10 is relatively or comparatively emitted more uniformly light distributed from the lower substrate 11 to the polarized light activation layer 12, the situation where light generated by the light source 10 is being concentrated in the vicinity of the light entrance side 11c before entering the polarized light activation layer 12 is avoided. Therefore, light source 10 with specific angle of the FWHM will enter the polarized light activation layer 12 with relatively more uniform light path distributions. In this manner, the light uniformity of the image generated by the display device 100 can be increased.

In the present embodiment, in the circumstance where light generated by the light source 10 is about non-polarized type, if the non-polarized light is emitted directly in the direction towards the inner polarizer layer 13 after passing through the lower substrate 11, the light will be transformed into polarized light by the inner polarizer layer 13 before reaching the light modulation layer 14. In the present embodiment, the display device 100 does not have a light focusing film and therefore the light distribution angle will be relatively large, which would allow the display device 100 to accomplish wide angle light distribution effects.

Referring to FIG. 3, after light enters the polarized light activation layer 12 through the bottom surface 11a of the lower substrate 11, the light will excite the polarized light activation layer 12 to generate polarized light. In other words, when light generated by the light source 10 enters the polarized light activation layer 12 after passing through the lower substrate 11, the polarized light activation layer 12 will correspondingly make this non-polarized light be excited to generate a plurality of polarized color light PCL of different colors. After the polarized color light PCL is formed, a portion of the polarized color light PCL will be emitted in the opposite direction to the lower substrate 11.

In the present embodiment, in order to enhance light utilization rate and increase image display effects, as exemplarily illustrated in FIG. 3, a reflective layer 9 may be disposed on a surface of the polarized light activation layer 12 opposite to the lower substrate 11. In other words, when the polarized color light PCL is emitted towards the direction away from the upper substrate 15, the reflective layer 9 will reflect these polarized color light PCL in the direction towards the upper substrate 15. In this manner, the polarized color light PCL produced by the polarized light activation layer 12 will directly, or through reflection, be emitted out of the polarized light activation layer 12 towards the upper substrate 15. However, the present invention is not limited or restricted to this embodiment. In other different embodiments, the reflective layer 9 may not be necessary, such as in the instance where the display device 100 does not have the reflective layer 9, the display device 100 can exhibit transparency effects. For example, when users are facing the display device 100 from the front of the display device 100, external light entering the display device 100 from the backside (back surface) is allowed to pass through the display device 100 such that the users may see the background.

In the present embodiment, light generated by the light source 10 has wavelength between 400-500 nm. As an example, the light source 10 can be a blue light, ultra-violet (UV) light, or a combination thereof. In this manner, the image generated by the display device 100 is formed mainly based on light generated by the polarized light activation layer 12. Under these circumstances, since UV light cannot been seen by the human eye, UV light would comparatively to blue light not affect the color of the display image. Therefore, in the present embodiment, comparatively to blue light, light produced by the light source 10 is preferably UV light in order to avoid affecting the image display color of the display device 100. If the light source 10 utilizes a UV light source, the polarized color light PCL generated by the polarized light activation layer 12 can include a polarized red light, a polarized green light, and a polarized blue light. However, the present invention is not limited or restricted to the above mentioned embodiments. It should be noted that even if the light generated by the light source 10 may possibly be a blue light, UV light, or combination thereof, the combination of the light source 10 and the polarized light activation layer 12 will substantially generate polarized white light since the polarized light activation layer 12 will absorb light from the light source 10 and be excited to generate polarized color light PCL.

Figure 4A:
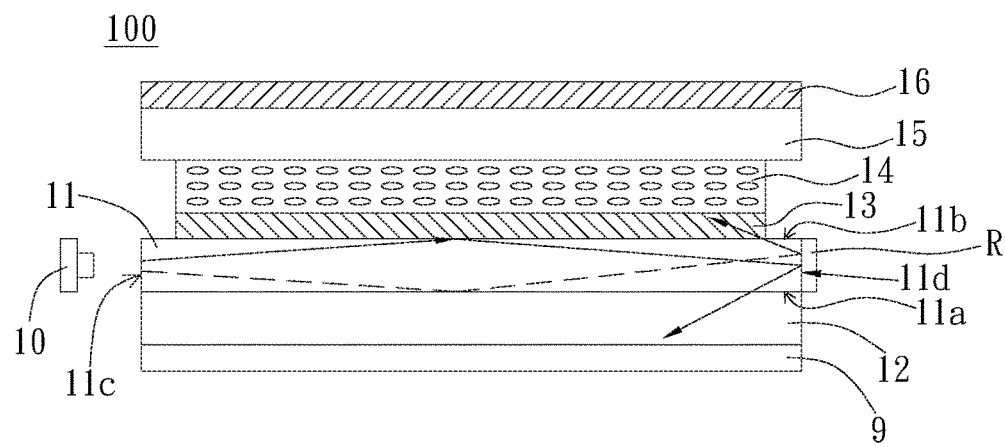
FIG. 4A is an embodiment of the display device having a reflective unit.
Figure 4B:
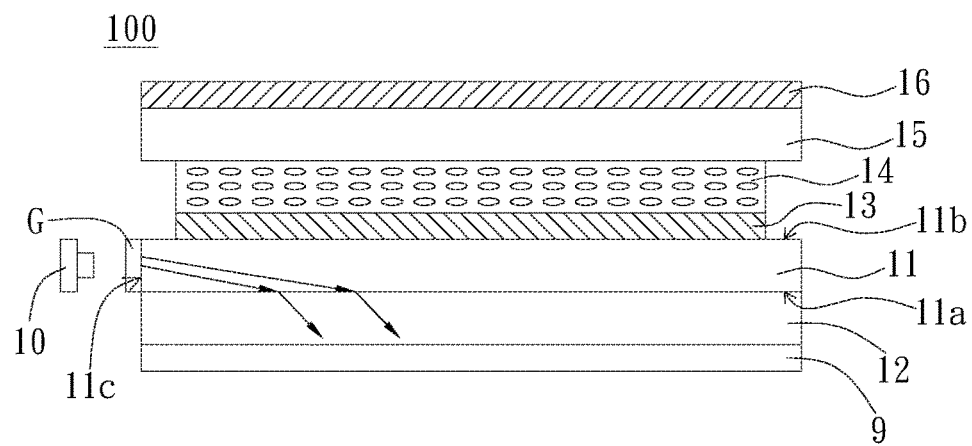
FIG. 4B is an embodiment of the display device having a guide prism.

FIGS. 4A and 4B respectively represent different embodiments of the present invention. As illustrated in FIG. 4A, the display device 100 can further include a reflective unit R disposed at a distal side 11d of the lower substrate 11, wherein the distal edge 11d and the light entrance side 11c are opposing left-right edges/sides. In the present embodiment, light from the light source 10 may be guided to the distal edge 11d through the lower substrate 11, wherein the reflective unit R will reflect the light toward the direction of the inner polarizer layer 13 or the polarized light activation layer 12. In this instance, a portion of the light will reach the reflective unit R at a wide/large angle and be guided toward the direction of the inner polarizer layer 13. As such, due to effects of optical lever, light may be rectified at the light emitting direction of the reflective unit R. However, if light is guided towards the direction of the polarized light activation layer 12 by the reflective unit R, these lights will excite (as mentioned above) the polarized light activation layer 12 to generate polarized color light PCL.

As illustrated in FIG. 4B, in another embodiment, the display device 100 can also include a guide prism G to solve the problem of light leakage of wide viewing angles. In the present embodiment, the guide prism G is disposed between the light source 10 and the light entrance side 11c. Guide prism G is adhered or attached onto the light entrance side 11c of the lower substrate 11, and is used for guiding light towards the direction of the polarized light activation layer 12. In this manner, the chance of light being guided or directed towards the polarized light activation layer 12 may be increased in order to increase the amount of light excitation in the polarized light activation layer 12. In other words, in the present embodiment, the light source 10 is used to provide sufficient amount of light to excite the polarized light activation layer 12 to produce light that is viewable by the human eye. For instance, the light source 10 can emit UV light to excite the polarized light activation layer 12 to subsequently form polarized color light PCL that can be seen by the human eye. In the present embodiment, when the light source 10 is complemented with the guide prism G, the guide prism G can guide the majority of the UV light towards the direction of the polarized light activation layer 12 in order to substantially increase the amount of light and light energy reaching the polarized light activation layer 12. In this manner, the amount of viewable light that is subsequently produced by the polarized light activation layer 12 can be increased. In the present embodiment, the majority of the light generated by the light source 10 is concentrated to be emitted into the polarized light activation layer 12 in order to generate the polarized color light PCL, wherein the brightness level of the polarized color light PCL will be higher than light from the light source 10. As a result, the image generated by the display device 100 will subsequently be brighter, richer in color, and the contrast levels will also have increased.

In addition to using the polarized light activation layer 12 to increase brightness, the polarized light activation layer 12 itself can also increase the amount of light scattering. When the polarized light activation layer 12 is excited, the polarized light activation layer 12 will in actuality generate polarized color light PCL that is emitted in 360 degrees in three dimensional space. However, devices that utilize conventional light guide plates have the shortcoming of light being concentrated such that display images have uneven or non-uniform brightness. Therefore, in comparison to structures that use light guide plates, the polarized color light PCL will be emitted out of the polarized light activation layer 12 in a more uniform light distribution and enable the display device 100 to display a more uniform display image.

Figure 5A:
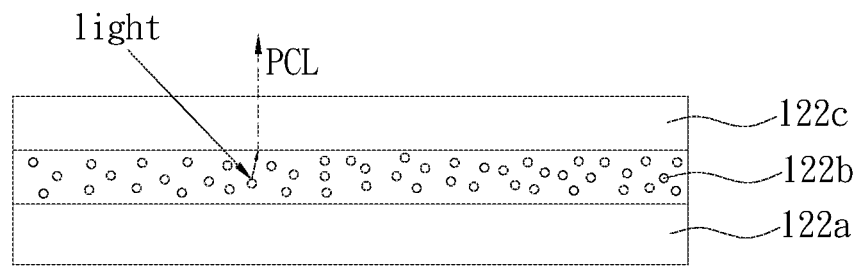
FIG. 5A is an embodiment of the polarized light activation layer having a plurality of quantum dots.

FIG. 5A is another embodiment of the polarized light activation layer 12 of FIG. 3, wherein the polarized light activation layer 12 has a plurality of quantum dots. As illustrated in FIG. 5A, the polarized light activation layer 12 may employ quantum dots 122b to generate light, wherein the polarized light activation layer 12 can include a film body 122a, a plurality of quantum dots 122b, and an outer polarizer layer 122c. As shown in FIG. 5A, the plurality of quantum dots 122b is distributed on the film body 122a, and the outer polarizer layer 122c covers the surface facing toward the lower substrate 11 of the film body 122a and the plurality of the quantum dots 122b. In other words, the outer polarizer layer 122c covers the film body 122a and is positioned between the lower substrate 11 and the quantum dots 122b. In the present embodiment, for instance, the core of the quantum dots 122b is formed of CdSe (Cadmium Selenide) and CdS (Cadmium Sulfide), wherein a shell body formed of ZnS (Zinc Sulfide), CdS, and ZnSe (Zinc Selenide) surrounds the core. In particular, the core of the quantum dots 122b can be formed from a nano-scaled crystal which can emit phosphor or fluorescence. Upon absorbing light generated by the light source 10, the crystal will be excited to generate color light. In the present embodiment, the material of the crystal of the quantum dots 122b preferably includes at least one of ZnS, ZnO, GaN, ZnSe, CdS, ZnTe, GaSe, CdSe, CdTe, GaAs, InP, GaSb, InAs, Te, PbS, InSb, PbTe, PbSe.

In the present embodiment, when light generated by the light source 10 reaches the quantum dots 122b, the quantum dots 122b will be excited to generate different color lights, wherein these different color lights will be transformed into polarized red light, polarized green light, and/or polarized blue light of the polarized color light PCL after passing through the outer polarizer layer 122c. In particular, when the different color lights generated by the quantum dots 122b arrives at the outer polarizer layer 122c, the different color lights having the same polarity as the outer polarizer layer 122c will pass through the outer polarizer layer 122c while the different color lights having different polarity to the outer polarizer layer 122c will be blocked by the outer polarizer layer 122c. Under these circumstances, since the outer polarizer layer 122c blocks portions of the excited light of the different color lights, the brightness level will be decreased a bit but the polarization levels will be much better.

Figure 5B:
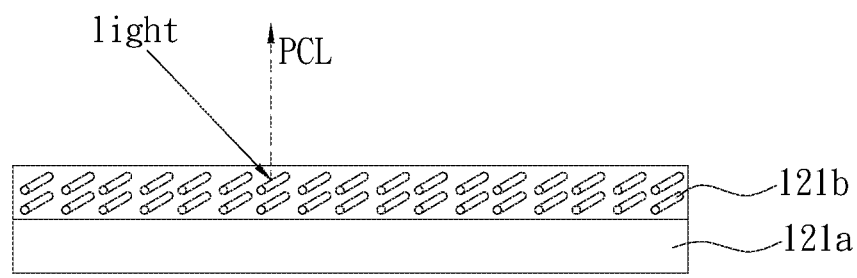
FIG. 5B is an embodiment of the polarized light activation layer having a plurality of quantum rods.

FIG. 5B is another embodiment of FIG. 5A, wherein the polarized light activation layer 12 has a plurality of quantum rods. As shown in FIGS. 3 and 5B, the polarized light activation layer 12 can also include a film body 121a and a plurality of quantum rods 121b. The plurality of quantum rods 121b are distributed on the film body 121a with their axial directions substantially aligned in the same direction with respect to each other. In other words, the directions of extension of each quantum rod 121b are respectively parallel with each other. In particular, the quantum rods 121b can be strip shaped or tubular shaped, wherein the strip shape or tubular shape has an extension direction. Therefore, in the present embodiment, the extension direction of each quantum rod 121b is parallel with each other, or has an error margin angle of plus-minus 5 degrees. As illustrated in FIGS. 3 and 5B, when light from the light source 10 excites the quantum rods 121b, the quantum rods 121b will generate the polarized color light PCL. Since the quantum rods 121b are disposed substantially aligned in the same direction with respect to each other on the film body 121a, light generated by the quantum rods 121b will naturally have a polarization direction. In the present embodiment, the core of the quantum rods 121b can be formed from a nano-scaled crystal which can emit phosphor or fluorescence. Upon absorbing light generated by the light source 10, the crystal will be excited to generate the polarized color light PCL. In particular, in the present embodiment, the materials of the crystal of the quantum rods 121b preferably includes at least one of ZnS, ZnO, GaN, ZnSe, CdS, ZnTe, GaSe, CdSe, CdTe, GaAs, InP, GaSb, InAs, Te, PbS, InSb, PbTe, and PbSe.

As illustrated in FIGS. 2A, 3, and 5B, after the polarized color light PCL is emitted out of the polarized light activation layer 12, the polarized color light PCL will pass through the lower substrate 11 and be guided to the inner polarizer layer 13. As shown in FIGS. 2A, 3, and 5B, the plurality of quantum rods 121b of the polarized light activation layer 12 have an average long axial direction avg, and the inner polarizer layer 13 has a penetrating axial direction T. In particular, the main purpose of the average long axial direction avg is that since the long axial direction of each quantum rod 121b will vary slightly with respect to each other, the preferred method is to control the average long axial direction of the all the quantum rods 121b. In the present embodiment, the average long axial direction avg of the quantum rods 121b is substantially the same direction as the penetrating axial direction T, wherein the margin of error is preferably substantially within plus-minus 5 degrees. Therefore, after the polarized color lights PCL generated by the plurality of quantum rods 121b passes through the lower substrate 11, since the penetrating axial direction T of the inner polarizer layer 13 is substantially the same direction as the polarization direction of the polarized color lights PCL, the polarized color lights PCL will raised in polarization levels by the inner polarizer layer 13 before arriving at the light modulation layer 14. For instance, if comparing the original polarized color light PCL that has not passed through the inner polarizer layer 13 with the polarized color light PCL that has passed through the inner polarizer layer 13, the polarization level of the polarized color light PCL that has passed through the inner polarizer layer 13 will be higher than the polarized color light PCL that has not passed through the inner polarizer layer 13. In terms of different colors of the polarized color lights PCL, the different colors of the red, green, and blue polarized color lights respectively have an average polarization long axis, wherein the direction of the average polarization long axis is substantially the same direction as the penetrating axial direction T of the inner polarizer layer 13. In the present embodiment, the margin of error between the substantial directions of the average polarization long axis of the polarized color lights PCL and the penetrating axial direction of the inner polarizer layer 13 is preferably within plus-minus 5 degrees. However, in other different embodiments, this margin of error can be adjusted according to design requirements.

In comparison to the embodiment of the quantum dots 122b of FIG. 5A, the quantum rods 121b of the embodiment of FIG. 5B have greater high color saturation and light output effects. In particular, as mentioned above, the polarized color lights PCL generated by the quantum rods 121b naturally have a polarization direction. Therefore, when the penetrating axial direction T of the inner polarizer layer 13 is substantially the same as the polarization direction of the polarized color lights PCL generated by the quantum rods 121b, this means that all of the polarized color lights PCL that is generated by the quantum rods 121b will substantially be able to pass through the inner polarizer layer 13 to form the display image of the display device 100. In contrast, as shown in FIGS. 3 and 5A and mentioned above, since the outer polarizer layer 122c will block portions of excited light (light generated by the quantum dots 122b) that does not have the same polarity (polarization direction) as the outer polarizer layer 122c, the brightness levels of the image displayed will be comparatively lower. In other words, in comparison to the embodiment of the quantum dots, since the polarized color lights PCL generated by the quantum rods will not be blocked by the inner polarizer layer 13, all of the generated polarized color lights PCL can substantially be applied towards producing the display image and help accomplish the effect of increasing the image light output levels of the display device 100. At the same time, while the polarization levels of the polarized color lights PCL is raised by the inner polarizer layer 13, the image generated by the display device 100 utilizing the quantum rods will correspondingly have advantages of having better high color saturation levels. Additionally, in comparison to the embodiment of the quantum dots of FIG. 5A, the embodiment of the quantum rods of FIG. 5B does not require the outer polarizer layer 122c. Therefore, in terms of the thickness of the display device 100, the thickness of the display device 100 utilizing the quantum rods will be smaller than utilizing quantum dots.

Figure 6A:
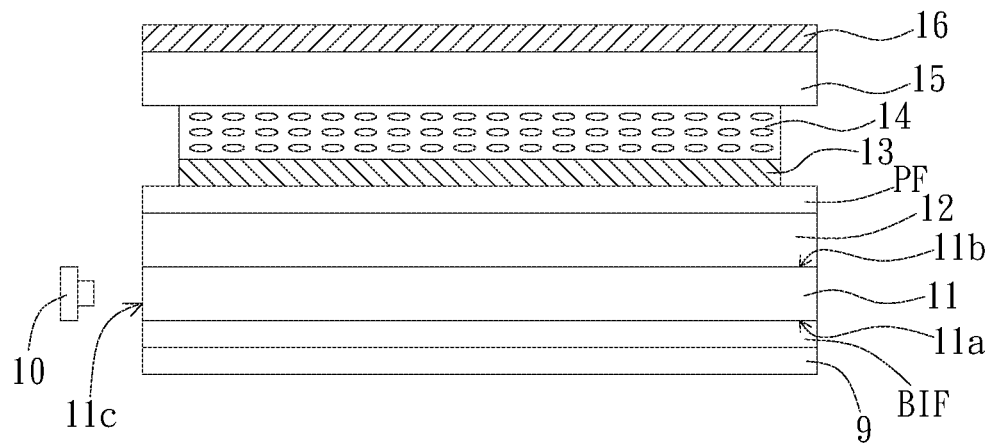
FIGS. 6A and 6B are different embodiments of the display device of FIG. 2A.
Figure 6B:
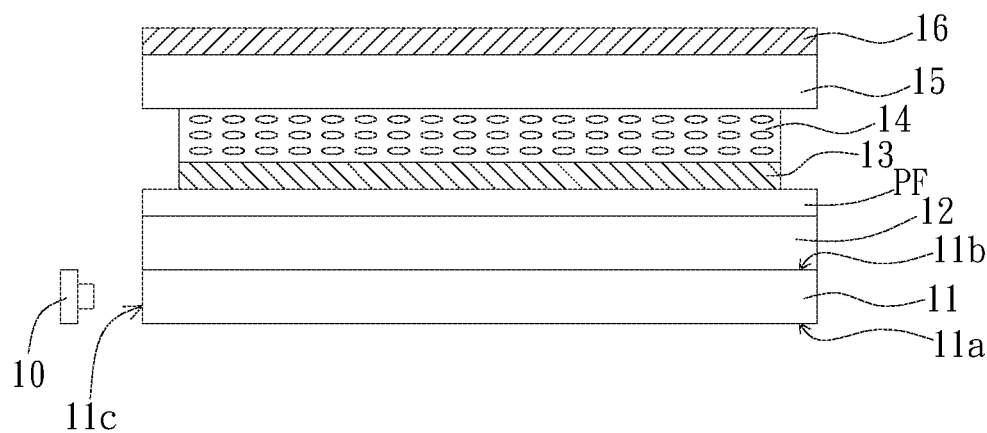

Referring to FIGS. 6A and 6B, FIGS. 6A and 6B are different embodiments of the display device 100 of FIGS. 2A and 2B.

As illustrated in FIG. 6A, instead of the polarized light activation layer 12 being disposed beneath the lower substrate 11, the polarized light activation layer 12 is disposed between the lower substrate 11 and the light modulation layer 14. For instance, the polarized light activation layer 12 is attached to or formed on the top surface 11b of the lower substrate 11, wherein a protective film PF is then coated or adhered onto the surface of the polarized light activation layer 12 facing towards the light modulation layer 14. As illustrated in FIG. 6A, the inner polarizer layer 13 disposed on the top surface 11b and positioned between the upper substrate 15 and the lower substrate 11. In particular, the inner polarizer layer 13 is then disposed between the protective film PF and the light modulation layer 14. The light modulation layer 14 is disposed between the inner polarizer layer 13 and the upper substrate 15. In the present embodiment, the protective film PF protects the polarized light activation layer 12 from water vapor and/or oxygen influence.

Referring still to FIG. 6A, in the present embodiment, when light from the light source 10 enters the polarized light activation layer 12 from the lower substrate 11, the light activation layer 12 will be excited to generate polarized color light as mentioned above. However, in the present embodiment, a brightness increasing film BIF and the reflective layer 9 can be disposed beneath the bottom surface 11a of the lower substrate 11. As shown in FIG. 6A, the brightness increasing film BIF is disposed on the bottom surface 11a of the lower substrate 11, wherein the reflective layer 9 is then disposed on the surface of the brightness increasing film BIF that is facing away from the lower substrate 11.

As illustrated in FIGS. 5A, 6A and 6B, in the present embodiment, the polarized light activation layer 12 being above the lower substrate 11, the film body 122a is positioned between the lower substrate 11 and the quantum dots 122b.

In the present embodiment, the brightness increasing film BIF includes a polarizer film (or a brightness enhancement film), such as an Advanced Polarizer Controlled Film (APCF). However, the brightness increasing film BIF is not restricted or limited to being an APCF type of film; in other different embodiments, the brightness increasing film BIF may be of any other different type of optical film that can increase the polarization level of light generated by the light source 10. In the present embodiment, the brightness increasing film BIF is adhered to the bottom surface 11a of the lower substrate 11 through an adhesive (not shown).

When light from the light source 10 enters the brightness increasing film BIF from the lower substrate 11, the brightness increasing film BIF will increase the polarization level of light having substantially the same polarity direction as the brightness increasing film BIF. The reflective layer 9 will then reflect this light back through the brightness increasing film BIF and the lower substrate 11 towards the polarized light activation layer 12. In this manner, the brightness increasing film BIF can more evenly and uniformly distribute the light from the light source 10 toward the polarized light activation layer 12.

In the present embodiment, by placing the polarized light activation layer 12 between the lower substrate 11 and the light modulation layer 14, light generated by the light source 10 can be directed to exciting the polarized light activation layer 12 to generate visible light. This in turn increases the brightness and high color saturation levels of the image display of the display device 100.

FIG. 6B is another embodiment of FIG. 6A wherein the lower substrate 11 does not have the brightness increasing film BIF and the reflective layer 9. In the present embodiment, by removing the brightness increasing film BIF and the reflective layer 9, external background light (environment light) may enter the display device 100 from the backside and pass through out the frontside of the display device 100 to accomplish a transparent display effect.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
    a lower substrate having a light entrance side, a bottom surface, and a top surface opposite to the bottom surface, the light entrance side respectively adjacently connected to the bottom surface and the top surface;
    a light source disposed at the light entrance side and generating light entering the lower substrate from the light entrance side;
    a polarized light activation layer disposed on the bottom surface;
    an upper substrate disposed on the top surface;
    an inner polarizer layer disposed on the top surface and positioned between the upper substrate and the lower substrate; and
    a light modulation layer disposed between the inner polarizer layer and the upper substrate;
    wherein at least a portion of the light entering the lower substrate passes through the bottom surface and enters the polarized light activation layer to excite the polarized light activation layer to generate a plurality of polarized color lights of different colors; the polarized color lights pass through the lower substrate to be raised in polarization levels by the inner polarizer layer before reaching the light modulation layer.

2. The display device of claim 1, wherein the polarized light activation layer comprises:
    a film body; and
    a plurality of quantum rods distributed on the film body with their axial directions substantially aligned in the same direction with respect to each other;
    wherein the light excites the quantum rods to generate the polarized color lights of different colors.

3. The display device of claim 2, wherein the quantum rods has an average long axial direction, the inner polarizer layer has a penetrating axial direction, and the average long axial direction is substantially in the same direction as the penetrating axial direction.

4. The display device of claim 2, wherein the polarized color lights of different colors respectively have an average polarization long axis, the inner polarizer layer has a penetrating axial direction, and the average polarization long axis is substantially in the same direction as the penetrating axial direction.

5. The display device of claim 1, wherein the polarized light activation layer comprises:
    a film body;
    a plurality of quantum dots distributed on the film body; and
    an outer polarizer layer covering the film body and positioned between the lower substrate and the quantum dots.

6. The display device of claim 1, wherein with respect to a cross-section that is simultaneously perpendicular to both the light entrance side and the bottom surface, an angle of the full-width half-maximum (FWHM) of light generated by the light source is between 10 degrees to 60 degrees.

7. A display device, comprising:
    a lower substrate having a light entrance side, a bottom surface and a top surface opposite to the bottom surface, the light entrance side respectively adjacently connected to sides of the bottom surface and the top surface;
    a light source disposed at the light entrance side and generating light entering the lower substrate from the light entrance side;
    a quantum rod film disposed on the bottom surface;
    an upper substrate disposed on the top surface;
    an inner polarizer layer disposed on the top surface and positioned between the upper substrate and the lower substrate; and
    a light modulation layer disposed between the inner polarizer layer and the upper substrate;
    wherein at least a portion of the light entering into the lower substrate passes through the bottom surface and enters the quantum rod film to excite the quantum rod film to generate a plurality of polarized color lights of different colors; the polarized color lights pass through the lower substrate to be raised in polarization level by the inner polarizer layer before reaching the light modulation layer.

8. The display device of claim 7, wherein the quantum rod film comprises:
    a film body; and
    a plurality of quantum rods distributed on the film body with their axial directions substantially aligned in the same direction with respect to each other, wherein the quantum rods has an average long axial direction, the inner polarizer layer has a penetrating axial direction, and the average long axial direction is substantially in the same direction as the penetrating axial direction.

9. The display device of claim 7, wherein the polarized color lights of different colors respectively have an average polarization long axis, the inner polarizer layer has a penetrating axial direction, and the average polarization long axis is substantially in the same direction as the penetrating axial direction.

10. The display device of claim 7, wherein with respect to a cross-section that is simultaneously perpendicular to both the light entrance side and the bottom surface, an angle of the full-width half-maximum (FWHM) of light generated by the light source is between 10 degrees to 60 degrees.

11. A display device, comprising:
- a lower substrate having a light entrance side, a bottom surface, and a top surface opposite to the bottom surface, the light entrance side respectively adjacently connected to the bottom surface and the top surface;
- a light source disposed at the light entrance side and generating light entering the lower substrate from the light entrance side;
- a polarized light activation layer disposed on the top surface;
- an upper substrate disposed on the polarized light activation layer;
- an inner polarizer layer disposed on the top surface and positioned between the upper substrate and the lower substrate; and
- a light modulation layer disposed between the inner polarizer layer and the upper substrate;
- wherein at least a portion of the light entering the lower substrate passes through the top surface and enters the polarized light activation layer to excite the polarized light activation layer to generate a plurality of polarized color lights of different colors; the polarized color lights pass through the inner polarizer layer to be raised in polarization levels before reaching the light modulation layer.

12. The display device of claim 11, wherein a brightness increasing film and a reflective layer are disposed on the bottom surface of the lower substrate.

13. The display device of claim 11, wherein the polarized light activation layer comprises:
- a film body; and
- a plurality of quantum rods distributed on the film body with their axial directions substantially aligned in the same direction with respect to each other;
- wherein the light excites the quantum rods to generate the polarized color lights of different colors.

14. The display device of claim 13, wherein the quantum rods has an average long axial direction, the inner polarizer layer has a penetrating axial direction, and the average long axial direction is substantially in the same direction as the penetrating axial direction.

15. The display device of claim 13, wherein the polarized color lights of different colors respectively have an average polarization long axis, the inner polarizer layer has a penetrating axial direction, and the average polarization long axis is substantially in the same direction as the penetrating axial direction.

16. The display device of claim 11, wherein the polarized light activation layer comprises:
- a film body;
- a plurality of quantum dots distributed on the film body; and
- an outer polarizer layer covering the film body;
- wherein the film body is positioned between the lower substrate and the quantum dots.

17. The display device of claim 11, wherein with respect to a cross-section that is simultaneously perpendicular to both the light entrance side and the bottom surface, an angle of the full-width half-maximum (FWHM) of light generated by the light source is between 10 degrees to 60 degrees.

* * * * *